United States Patent
Wagner (10) Patent No.: US 10,815,636 B2
(45) Date of Patent: Oct. 27, 2020

(54) TOOL CHANGER FOR A CONSTRUCTION MACHINE

(71) Applicant: Guangxi LiuGong Machinery Co., Ltd., Liuzhou, Guangxi (CN)

(72) Inventor: Edward Wagner, Guangxi (CN)

(73) Assignee: Guangxi LiuGong Machinery Co., Ltd., Liuzhou, Guangxi (CN)

( * ) Notice: Subject to any disclaimer, the term of this patent is extended or adjusted under 35 U.S.C. 154(b) by 229 days.

(21) Appl. No.: 16/110,072

(22) Filed: Aug. 23, 2018

(65) Prior Publication Data

US 2019/0368155 A1  Dec. 5, 2019

Related U.S. Application Data

(63) Continuation of application No. PCT/CN2018/089548, filed on Jun. 1, 2018.

(51) Int. Cl.
*E02F 3/36* (2006.01)
*E02F 3/96* (2006.01)
*E02F 9/16* (2006.01)
*B23Q 3/155* (2006.01)

(52) U.S. Cl.
CPC ............ *E02F 3/3663* (2013.01); *B23Q 3/155* (2013.01)

(58) Field of Classification Search
CPC . E02F 5/145; E02F 3/964; E02F 3/965; E02F 3/439; E02F 3/146; E02F 3/966; E02F 9/003; E02F 9/24; E02F 3/3663; B23Q 3/155
USPC ............ 37/403–410, 468; 414/694, 685, 687
See application file for complete search history.

(56) References Cited

U.S. PATENT DOCUMENTS

| | | | | |
|---|---|---|---|---|
| 4,869,002 A * | 9/1989 | Glenn | ..................... | E02F 3/384 37/403 |
| 6,125,945 A * | 10/2000 | Skaggs | ................ | A01B 59/043 172/439 |
| 7,257,910 B2 * | 8/2007 | Underwood | ............ | E02F 3/425 37/403 |
| 7,421,952 B2 * | 9/2008 | Taylor | ................... | B61D 15/02 104/2 |

(Continued)

FOREIGN PATENT DOCUMENTS

| CN | 203613571 U | 5/2014 |
|---|---|---|
| CN | 105019494 A | 11/2015 |

(Continued)

OTHER PUBLICATIONS

Partial European Search Report in corresponding European Patent Application No. 18187258.1, dated Jan. 8, 2019, 15 pgs.

(Continued)

*Primary Examiner* — Robert E Pezzuto
(74) *Attorney, Agent, or Firm* — Young Basile Hanlon & MacFarland, P.C.

(57) ABSTRACT

A tool changer for a construction machine includes at least one tool retaining portion for holding a tool being mountable to the tool mount, the tool changer being configured to be movably attached to the construction machine. The tool changer also includes and a moving mechanism for moving the tool retaining portion in alignment with the articulated boom of the construction machine to allow for picking of the tool by the tool mount. The construction machine includes an articulated boom with a tool mount.

16 Claims, 10 Drawing Sheets

(56) References Cited

U.S. PATENT DOCUMENTS

| | | | |
|---|---|---|---|
| 7,926,206 B1 | 4/2011 | Ruggiero | |
| 8,539,699 B2 * | 9/2013 | Ramun | B23D 31/008 |
| | | | 37/403 |
| 9,127,442 B1 * | 9/2015 | Underwood | E02F 3/964 |
| 10,648,155 B2 * | 5/2020 | Wagner | E02F 9/24 |
| 2007/0221600 A1 | 9/2007 | Davis | |

FOREIGN PATENT DOCUMENTS

| | | |
|---|---|---|
| DE | 9106734 U1 | 9/1991 |
| DE | 102008039627 A1 | 3/2010 |
| EP | 1785689 A1 | 5/2007 |
| JP | 2004316168 A | 11/2004 |

OTHER PUBLICATIONS

International Search Report in corresponding International Patent Application No. PCT/CN2018/089548, dated Feb. 27, 2019, 5 pgs.

* cited by examiner

TOOL CHANGER FOR A CONSTRUCTION MACHINE

CROSS-REFERENCE TO RELATED APPLICATION(S)

This application claims priority to PCT/CN2018/089548 filed Jun. 1, 2018, the content of which is incorporated herein in its entirety by reference.

TECHNICAL FIELD

This disclosure relates to tool changers for construction machines.

BACKGROUND

Construction machines with an articulated boom having a single multi-operational tool mount that is arranged at the distal end of the articulated boom, are known. The multi-operational tool mount can be used with different tools. The distal end of the articulated boom may be a free end of the articulated boom, which may be remote from a rigid or flexible connection of the articulated boom with an upper structure of the construction machine. The upper structure of the construction machine may be a machine body.

For changing tools of such a construction machine, it is commonly necessary to lay down a tool on, and pick up another tool from, the ground of the construction site. Thus, changing of tools may be time consuming, which results in standstill of the construction machine, as manual work steps are necessary for carrying out a tool exchange.

SUMMARY

Disclosed herein are aspects, features, elements, implementations, and embodiments of tool changers for construction machines.

An aspect of the disclosed embodiments is a tool changer for a construction machine is provided. The construction machine comprises an articulated boom with a tool mount. The tool changer may be used on all kinds of civil engineering construction machines, such as on an excavator, a loader or a combined loader-excavator construction machine. The tool changer comprises at least one tool retaining portion for holding a tool, wherein the tool is configured to be mounted on the tool mount. The tool changer is configured to be movably attached to the construction machine and comprises a moving mechanism for moving the tool retaining portion in alignment with the articulated boom of the construction machine to allow for picking of the tool by the tool mount. Moving a tool in alignment with the articulated boom is understood as moving the tool to a position, at which it may be picked up by the tool mount attached to the articulated boom.

The tool changer according to the disclosure is a device for providing an additional tool on the construction machine, wherein the additional tool may be mounted on the tool mount of the construction machine. The tool changer may also be a device for changing of tools of a construction machine. Mounting or changing a tool may be carried out automatically, in particular without manual tool handling by a machine driver or a further construction worker. Thus, the tool changer may provide a mechanism for self-mounting or self-exchanging of tools on a construction machine. Utilizing the tool changer according to the present disclosure on a construction machine may provide an additional tool for carrying out an additional work task. For example, a hydraulic hammer or a cutter head may be provided on the construction machine next to a conventional bucket, e.g. an excavator bucket or a loader bucket.

The tool changer may be movably attachable to an upper structure or to a chassis of the construction machine. The tool changer may be movably attached to a machine frame or to a machine body of the construction machine. The machine frame may be the basic structure of the upper structure.

For holding and storing a tool with the tool changer, at least one tool retaining portion may be provided on the tool changer. The tool retaining portion may be a separate part, e.g. a tool retainer. The tool changer may comprise a base plate or base frame, at which the at least one tool retaining portion may be provided. The tool retaining portion may be a recess inside the base plate or a tool counterpart constructed on the base plate, both for accommodating and supporting a tool. The recess or counterpart may be designed to include at least a portion corresponding in shape to the shape of the tool to be carried for providing an intimate fit between the respective tool and the tool retaining portion.

The tool changer according to the disclosure provides movability of the tools on the construction machine, in particular of the tools relative to the machine body. The tool changer may be movably attached to the machine body and may be shifted and/or rotated with respect to the latter. Shifting and/or rotation of the tool changer may provide movability of the tool being held on the tool changer towards and into the working range of the tool mount of the construction machine. Thus, the movability of the tool changer itself may compensate for a limited movability of the tool mount that is mounted on the articulated boom. Accordingly, the tool changer allows for a tool storage at areas of the machine, which are not reachable by the tool mount of the articulated boom. The movability of the tool changer may be adapted to the existing movability of the articulated boom to allow for an integrated direct picking of a tool from the tool changer by the tool mount.

A core idea of the disclosure resides in the fact that a construction machine with an articulated boom may change its tools autonomously and in situ when being equipped with a tool changer according to the present disclosure. Accordingly, a tool change can be carried out without macroscopically moving a chassis of the construction machine and even further without any rotation of construction machine's machine body. A further advantageous effect may be seen in the fact that a tool, which is not in use, does not have to be put aside or stored in a warehouse, but is directly provided on the construction machine by the tool changer.

The moving mechanism of the tool changer according to the present disclosure may comprise a pivoting mechanism for pivoting the tool retaining portion in alignment with the articulated boom of the construction machine. The tool changer as well as the articulated boom may be pivotably mounted on or hinged to a rigid machine frame of the construction machine. The tool changer may be rigidly or movably attached to links that in turn may be rigidly or movably attached to the machine frame. The links may thus interconnect the tool changer and the rigid machine frame. The machine frame of the construction machine may be pivotably supported on a chassis of the construction machine. The tool changer may be pivoted in a horizontal plane about a vertical axis and the articulated boom may be pivoted in a vertical plane at least about a horizontal axis. This complementary pivoting movements of articulated boom and tool changer allow for an efficient and space-saving tool exchange without moving the construction machine itself.

Alternatively, or additionally, the moving mechanism of the tool changer according to the disclosure may comprise a linear shifting mechanism for shifting the tool retaining portion in alignment with the articulated boom of the construction machine. The shifting mechanism may be a drawer-like mechanism. The shifting may comprise a translation of the tool retaining portion towards the tool mount of the articulated boom. The shiftable tool changer may be mounted on the machine frame or on the chassis of the construction machine, wherein the machine frame and the chassis may be rotatable with respect to each other. The tool changer may be shifted in a horizontal plane, wherein the articulated boom may be pivoted in a vertical plane. The shifting direction of the tool changer may be in line with the pivoting plane of the articulated boom to allow for picking of the tool by the tool mount of the articulated boom. This provides a custom-made and space-saving tool exchange mechanism.

The tool changer according to the present disclosure may further comprise a hinging portion, in particular a pivot arm, for pivotably attaching the tool changer to the construction machine. The hinging portion may interconnect the machine frame of the construction machine with the tool retaining portion of the tool changer. The hinging portion may provide a spacing between the machine frame and the tool retaining portion when pivoting the tool changer with respect to the machine frame. The tool changer may comprise at least components of a four-bar linkage. The four-bar linkage may comprise two hinging portions, in particular two pivot arms, for pivotably attaching the tool changer to the construction machine. At least one hinging portion and/or pivot arm may interconnect the machine frame of the construction machine with the tool retaining portion of the tool changer.

The moving mechanism of the tool changer according to the present disclosure may comprise an actuator, in particular a hydraulic positioning cylinder, for providing the movability of the tool changer. The tool changer may be moved hydraulically with respect to the construction machine. The hydraulic positioning cylinder may interconnect the tool retaining portion with the machine frame of the construction machine. The hinging portion of the tool changer and the hydraulic positioning cylinder may be connected with the tool retaining portion at opposite sides thereof so as to provide an advantageous lever arm when pivoting the retaining portion with the hydraulic positioning cylinder around a pivot point of the hinging portion. Alternatively, or additionally, the tool changer may be moved electrically with respect to the construction machine. To do this, an electric motor may be provided on the tool changer or on the construction machine. The actuator according to this embodiment allows for an automatic movement of the tool changer to an alignment position with the articulated boom of the construction machine. Accordingly, a remote control of the moving mechanism is possible.

The tool changer according to the present disclosure may further comprise at least one clamping means for securing the tool on the tool retaining portion. The clamping means may be arranged on the tool retaining portion or may be part of a tool retaining means which may be additionally provided adjacent to the tool retaining portion on the tool changer. The clamping means may comprise at least one clamp for engaging with the tool to be carried. The clamp may be adapted to exert a pressing force onto the tool to be hold. Alternatively, or additionally, the tool changer may comprise at least one pin for engaging with the tool to be carried. The pin may be electrically or hydraulically driven. Providing a retaining or clamping means may increase a safe stowing and exchanging of tools on the construction machine.

The present disclosure further relates to a method of retrofitting a construction machine comprising the step of mounting the tool changer according to any of the above described embodiments on the construction machine. A retrofit according to the disclosure may comprise a modification of the design of the construction machine itself and/or simply an attachment of the tool changer to the latter. The tool changer may be mounted on the chassis or the upper structure to allow for a movement of the tool changer with respect to the machine body of the construction machine to align the tool changer with the articulated boom of the construction machine. The alignment allows for a picking of the tool by the tool mount of the articulated boom.

The construction machine according to the disclosure comprises an upper structure, an articulated boom with a tool mount, the boom being arranged on the upper structure, and a tool changer according to any of the above described embodiments.

The construction machine may further comprise a chassis, which can be a wheel-driven chassis or a chain-driven chassis. The upper structure may be movably, in particular rotatable, mounted on the chassis. The articulated boom may be pivotably arranged on the upper structure, in particular a machine frame, and may comprise a plurality of arms being connected in an articulated manner. The tool mount may be attached to a distal end of the articulated boom, in particular to a distal arm of the articulated boom. The distal arm may be connected in an articulated manner to a proximal arm, which is in turn connected in an articulated manner to the upper structure of the construction machine.

The movable attachment of the tool changer to the upper structure of the construction machine may provide a movement of the tool changer between a stowed condition of the tool changer remote from the tool mount of the articulated boom to a changing condition, in which the tool changer is aligned with the articulated boom and/or the tool mount. The stowed condition may be a stowed position of the tool changer close to or adjacent to the upper structure, at which the tool changer may be integrated into the upper structure. The changing condition may be a position of the tool changer away from the upper structure. With respect to the machine body of the construction machine, the stowed condition may be a proximal condition and the changing condition may be a distal condition of the tool changer. At the changing condition of the tool changer, the tool retaining portion of the tool changer may be in alignment with the tool mount of the articulated boom.

The construction machine according to the disclosure may comprise an upper structure with a recess for accommodating the tool changer in a stowed condition. The tool changer may be at least partly located in the recess when being in a stowed condition. For accommodating the tool changer, the tool changer may be pivoted and/or shifted in the recess. For moving the tool changer to a changing condition, the tool changer may be pivoted and/or shifted out of the recess. Providing the recess allows for an integration of the tool changer in the machine body and prohibits an enlargement of the machine.

The tool changer may have a plurality of tool retaining portions, in particular two tool retaining portions, each of them for holding a tool. Furthermore, the tool changer may be movably attached to the upper structure for providing movability of the tool changer from a stowed condition to a plurality of alignment conditions with the tool mount of the articulated boom, in particular two different alignment conditions. Each of the alignment conditions allows for picking of one of the tools by the tool mount. At least one of the alignment conditions may be the changing condition of the tool changer. At least two different tools may be provided in the plurality of tool retaining portions. The movability of the tool changer may be continuous, meaning that the position of the tool changer may be adjustable in a step-less manner. Alternatively, or additionally, the tool changer may be moved to discrete moving positions. Providing a multi-tool changer with multiple alignment conditions allows for the provision of multiple operational modes of a construction machine, wherein the tools for the different operational modes are provided on the machine.

An upper structure of the construction machine and the tool changer may be interconnected by at least one articulation, in particular at least one pivot joint, for providing a pivot movability of the tool changer with respect to the upper structure. The pivot joint may be a swivel for turning of the tool changer. The pivot joint may be located at the bottom side of a machine frame of the upper structure. The location of the pivot joint may also be adjacent to a recess of the upper structure for accommodating the tool changer. A four-bar linkage may be provided for providing the pivot movability of the tool changer with respect to the upper structure. The four-bar linkage may comprise the at least one articulation. The four-bar linkage may also be described as a double pivot joint that may be located at the bottom side of the machine frame of the upper structure.

In a further aspect, the present disclosure relates to a method of mounting a tool on a construction machine having an upper structure and an articulated boom that is arranged on the upper structure. The method comprises the steps of moving, in particular pivoting, a tool changer being movably attached to the upper structure in alignment with a tool mount of the articulated boom and picking a tool, which is provided on the tool changer, by the tool mount.

The method may further comprise the movement of the tool mount of the articulated boom towards the tool changer. The movement may be realized by moving the articulated boom towards the tool changer. Picking of the tool with the tool mount may be carried out with a mechanical locking mechanism, by which the tool is movably locked to the tool mount.

The method according to the disclosure may further comprise the step of storing a tool, which is mounted on the tool mount, in the tool changer. The method may comprise the step of storing a first tool in the tool changer and subsequently picking up a second tool from the tool changer. Thus, tools may be exchanged via the tool changer. Therefore, the tool changer may also be described as a tool shelf or tool storage, wherein a tool to be used may be chosen from the tool changer and a tool not to be used may be put in stock onto the tool changer. A tool change may thus be carried out without laying down a tool onto the ground and without moving away from the actual working position.

Another aspect of the disclosed embodiments is a tool changer for a construction machine with an articulated boom, the boom having a tool mount. In some embodiments, a construction machine may comprise such a tool changer.

Another aspect of the disclosed embodiments is a method of mounting a tool on a construction machine.

Another aspect of the disclosed embodiments is a method of retrofitting a construction machine with a tool changer.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Embodiments of the present disclosure are subsequently described with reference to the attached FIGS. 1 to 22.

FIGS. 1 to 6 show a multi tool construction machine 1 according to an embodiment of the present disclosure, wherein the construction machine 1 is shown in different operational modes. The construction machine 1 comprises a chassis 4, an upper structure 5, and an articulated boom 2.

The chassis 4 may be a chain-driven chassis 4 or a wheel-driven chassis (not shown). The upper structure 5 may be arranged on the chassis 4 in a pivotable manner to be rotatable with respect to the chassis 4. The rotatability of the upper structure 5 with respect to the chassis 4 may be provided around a vertical axis of rotation. Additionally, or alternatively, the upper structure 5 is 360°-rotatable with respect to the chassis 4.

Figure 8:
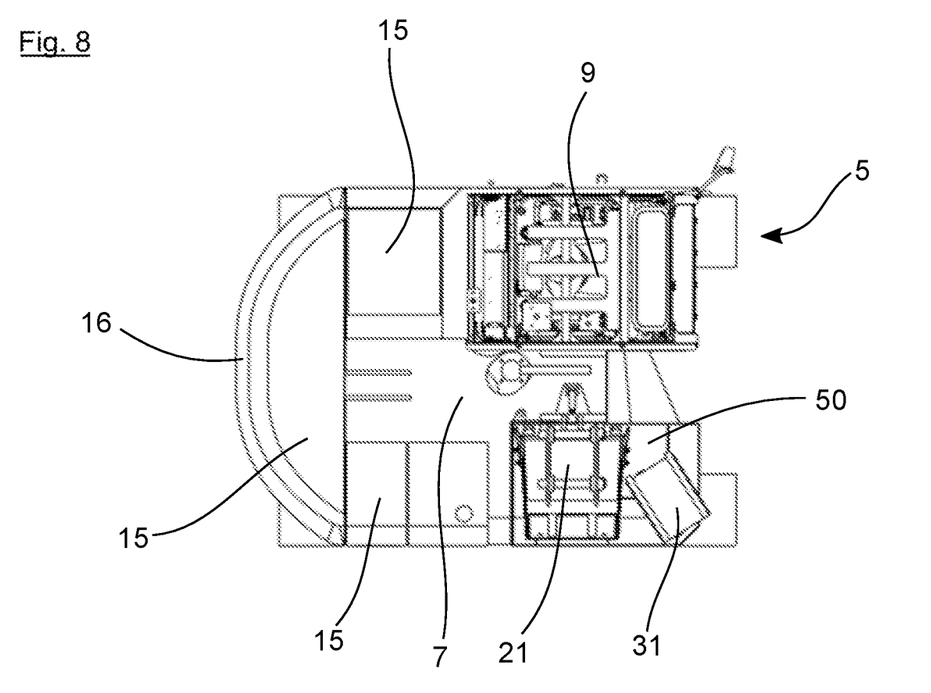
FIG. 8 generally illustrates a plan view of an upper side of the upper structure of the construction machine of FIG. 1 with the tool changer in the stowed condition.
Figure 10:
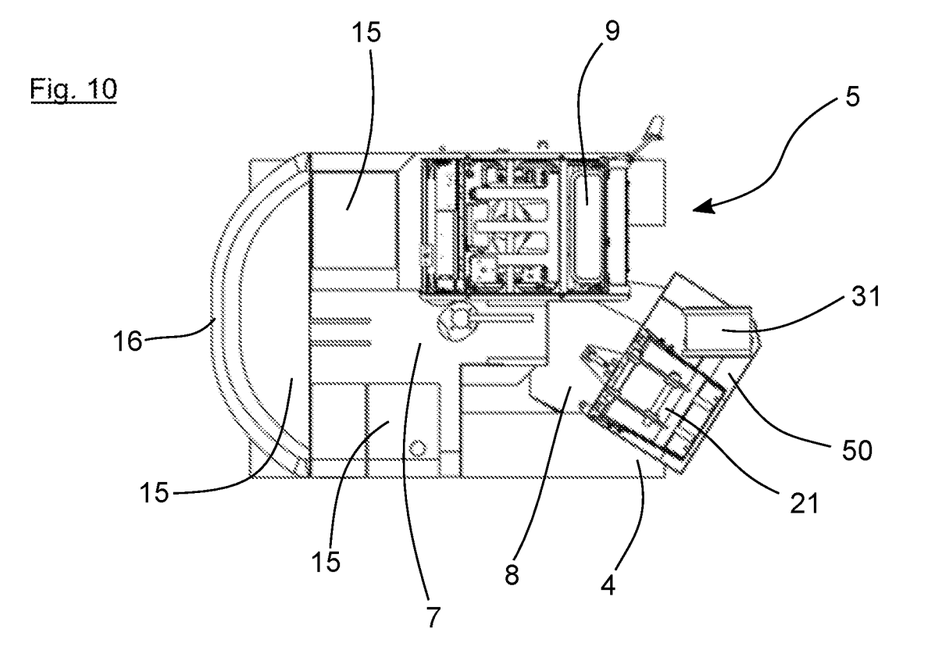
FIG. 10 generally illustrates a plan view of the upper side of the upper structure of the construction machine of FIG. 1 with the tool changer in the alignment condition.
Figure 12:
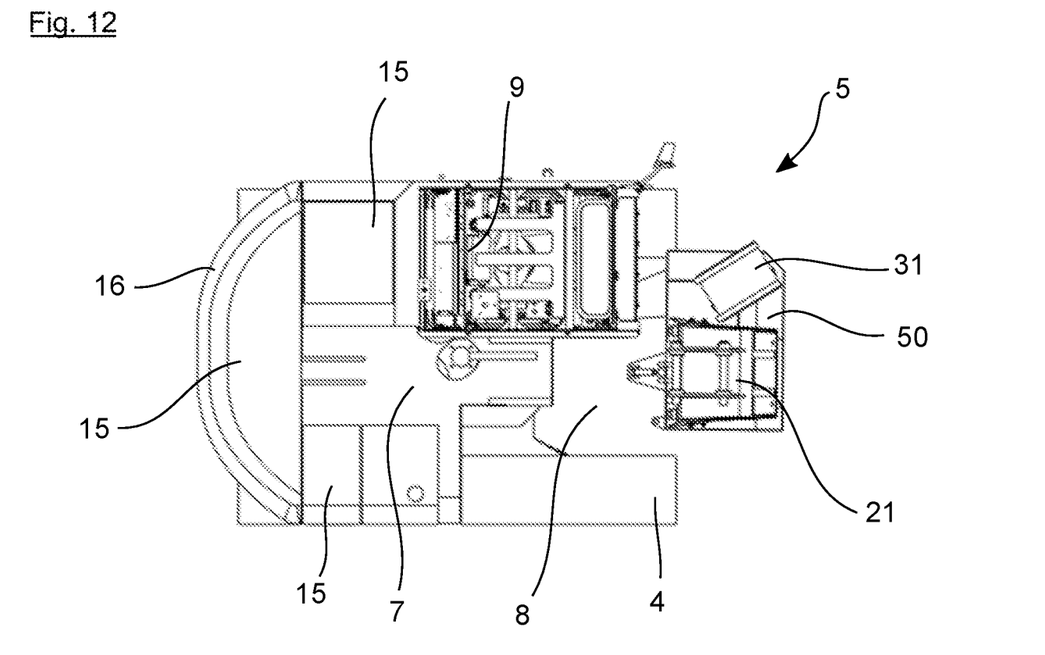
FIG. 12 generally illustrates a plan view of the upper side of the upper structure of the construction machine of FIG. 1 with the tool changer in the further alignment condition.
Figure 13:
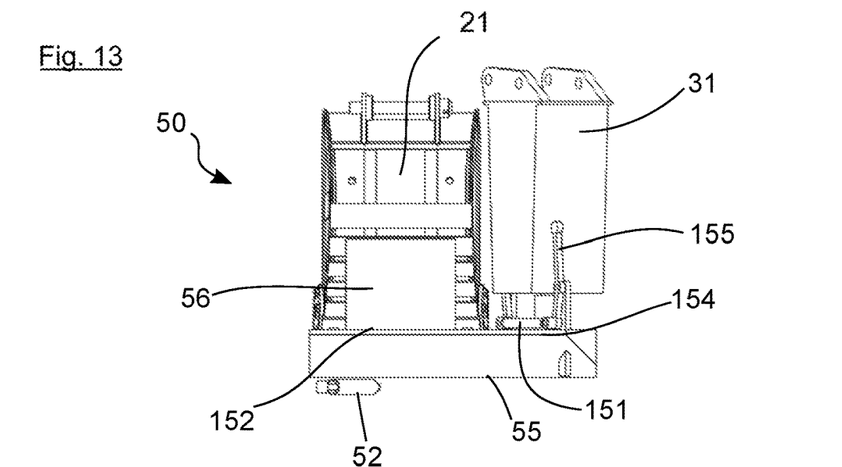
FIG. 13 generally illustrates a side view of a loaded tool changer of the construction machine of FIG. 1.
Figure 14:
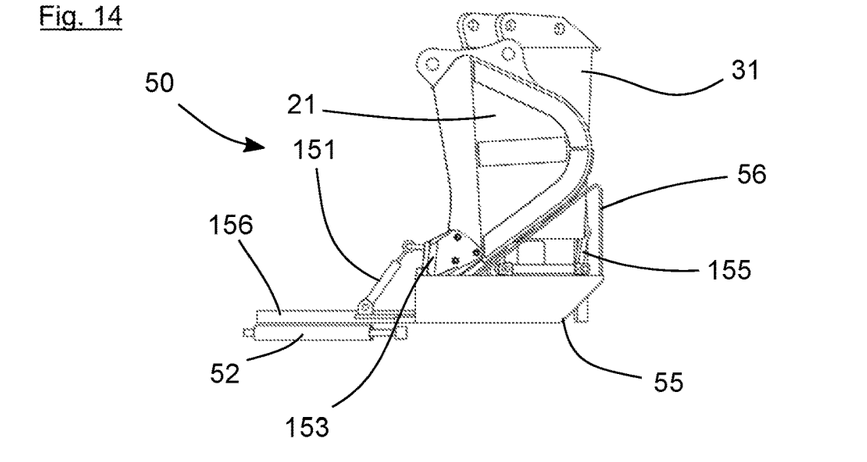
FIG. 14 generally illustrates a further side view of the loaded tool changer of FIG. 13.
Figure 15:
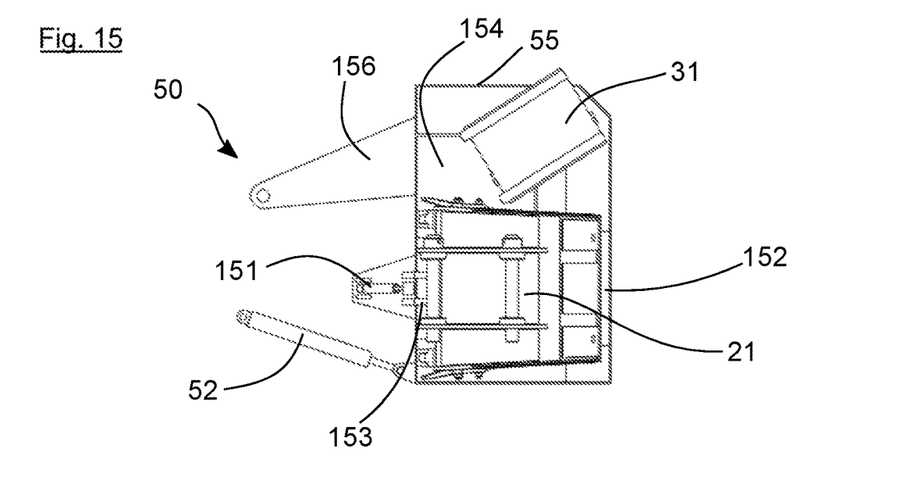
FIG. 15 generally illustrates a plan view from above of the loaded tool changer of FIG. 13.
Figure 16:
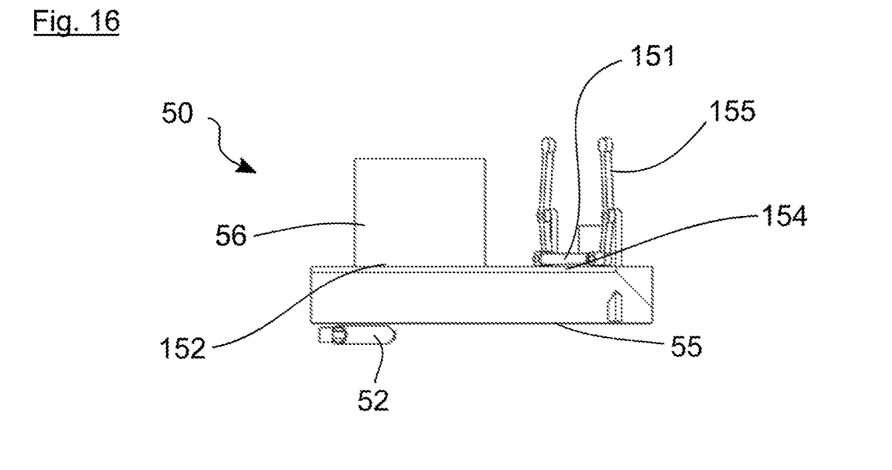
FIG. 16 generally illustrates a side view of the tool changer of FIG. 13 without tools.
Figure 17:
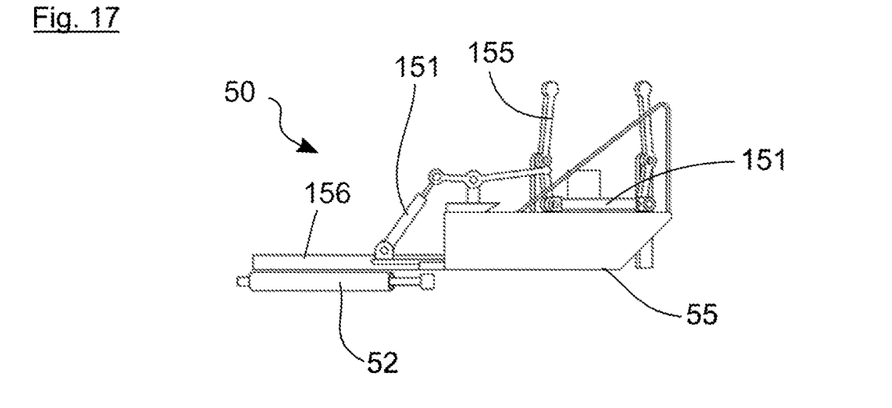
FIG. 17 generally illustrates a further side view of the tool changer of FIG. 16.
Figure 18:
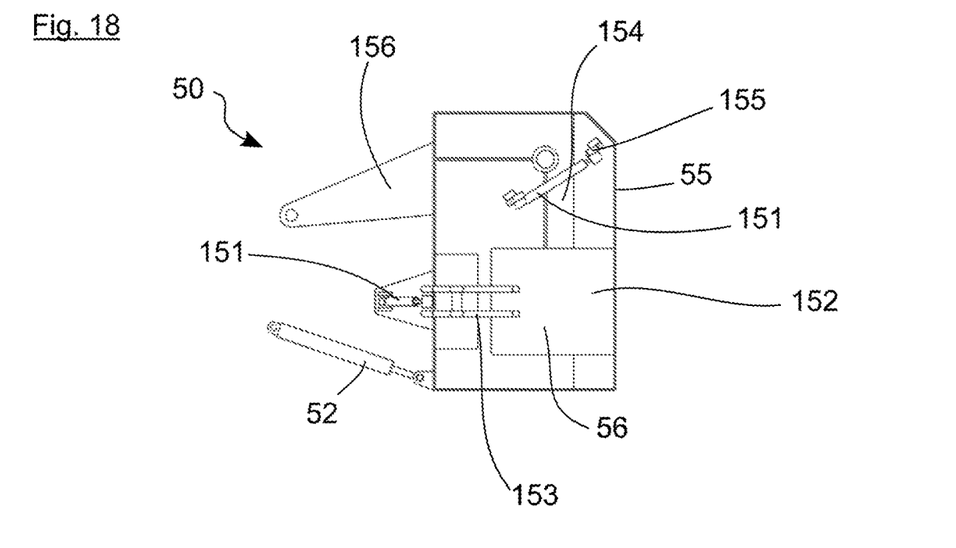
FIG. 18 generally illustrates a plan view from above of the tool changer of FIG. 16.

The upper structure 5 may comprise a machine frame 6 as a base frame or basic framework of the upper structure 5. The upper structure 5 may further comprise a driver's cabin 9, an engine-hydraulic unit 15, and/or a counterweight 16. The upper structure 5 may further comprise at least one battery (not shown) and at least one electric motor (not shown), which may be connected to the battery for operating the multi tool construction machine 1 or at least one component thereof. For example, the chassis 4, the upper structure 5, and/or the articulated boom 2 may be operated by the electric motor. A hydraulic pump (not shown) for operating hydraulic actuators and a swing drive (not shown) for rotating the upper structure 5 with respect to the chassis 4 may further be provided. The electric motor may drive the hydraulic pump. The driver's cabin 9, the engine-hydraulic unit 15, and the counterweight 16 may be arranged on the machine frame 6. The upper structure 5 may further comprise a recess 7. The recess 7 may be formed above the machine frame 6 for accommodating at least part of the articulated boom 2, i.e. the proximal arm 62, when being folded towards or against the machine frame 6. The driver cabin 9, the engine-hydraulic unit 15, and/or the counterweight 16 may be arranged around the recess 7. In other words, the recess 7 may be surrounded by the driver cabin 9, the engine-hydraulic unit 15, and/or the counterweight 16. As illustrated in FIGS. 8, 10, and 12, the engine-hydraulic unit 15 may be arranged on both sides of the recess 7. The driver cabin 9 as well as the engine-hydraulic unit 15 may be arranged on opposite sides of the upper structure 5 and the machine frame 6, respectively. The articulated boom 2 may be arranged between the driver cabin 9 and the engine-hydraulic unit 15.

The articulated boom 2 may be arranged on the upper structure 5, wherein the articulated boom 2 may be a three-armed boom 2 or a two-armed boom (not shown). At one boom end, the articulated boom 2 may be pivotably attached to the machine frame 6 by means of a first articulation 61. The first articulation 61 may be a pivot joint. The first articulation 61 may be provided at a central position of the machine frame 6 in widthwise direction of the upper structure 5 and in front of to the vertical axis of rotation of the upper structure 5 in length-wise direction of the upper structure 5. At the other end of the articulated boom 2, which is not attached to the machine frame 6, a tool mount 3 may be pivotably arranged.

The articulated boom 2 may comprise a proximal arm 62, an intermediate arm 64 and a distal arm 66. The proximal arm 62 may be hinged to the machine frame 6 by means of the first articulation 61, the intermediate arm 64 may be hinged to the proximal arm 62 by means of a second articulation 63 and/or the distal arm 66 may be hinged to the intermediate arm 64 by means of a third articulation 65. The articulations 61, 63, 65 may be designed as pivoting joints. The first articulation 61 may interconnect the proximal arm 62 and the upper structure 5 and the machine frame 6, respectively, the second articulation 63 may interconnect the intermediate arm 64 and the proximal arm 62 and the third articulation 65 may interconnect the distal arm 66 and the intermediate arm 64.

The articulated boom 2 may further comprise a first positioning cylinder 82 for pivoting the proximal arm 62, a second positioning cylinder 84 for pivoting the intermediate arm 64, a third positioning cylinder 86 for pivoting the distal arm 66, and/or a fourth positioning cylinder 88 for pivoting the tool mount 3.

The first positioning cylinder 82 may be hinged to the machine frame 6 rearward of the first articulation 61. Furthermore, the first positioning cylinder 82 may be hinged to the backside of the distal end of the proximal arm 62, the backside being that side which is facing away from the intermediate arm 64. The first positioning cylinder 82 may be a boom cylinder for pivoting the entire articulated boom 2 with respect to the machine frame 6. The second positioning cylinder 84 may be hinged to the distal end of the proximal arm 62 and to a distal end of the intermediate arm 64. The second positioning cylinder 84 may be arranged beneath the intermediate arm 64. The third positioning cylinder 86 may be hinged to a proximal end of the intermediate arm 64 and to a proximal end of the distal arm 66. The third positioning cylinder 86 may be arranged above the intermediate arm 64 and/or above the second positioning cylinder 84. The second positioning cylinder 84 and the third positioning cylinder 86 may be arranged substantially parallel to each other in all operating positions of the boom. The fourth positioning cylinder 88 may be hinged to a proximal end of the distal arm 66 and to the tool mount 3 at the distal end of the distal arm 66. The fourth positioning cylinder 88 may be arranged above the distal arm 66, i.e. on that side of the distal arm 66 which is facing away from the proximal arm 62.

Different tools 10, 20, 30 may be provided on the construction machine 1, which are configured to be mounted to the tool mount 3 that may be pivotably attached to the distal arm 66. A fourth articulation 67 may interconnect the distal arm 66 and the tool mount 3. Tools 10, 20, 30 not mounted to the tool mount 3 are carried by the construction machine 1. A first tool 10 may be a loader bucket 11, a second tool 20 may be an excavator bucket 21 and a third tool 30 may be a hammer 31, wherein at least the loader bucket 11 and the excavator bucket 21 may be provided on the construction machine 1. The hammer 31 may be a hydraulic hammer. Alternatively, or additionally, only two tools out of the different tools 10, 20, 30 may be provided on the machine.

The chassis 4 may comprise a first tool carrier 40 and the upper structure 5 may further comprise a second tool carrier 50, wherein the first tool carrier 40 and/or the second tool carrier 50 may provide a tool storage on the construction machine 1. The second tool carrier may be configured as a tool changer 50. The first tool carrier 40 may be arranged at the rear side of the chassis 4 and may be configured to carry the first tool 10. The first tool carrier 40 may be tiltable and may be moved between an upward position as shown in FIGS. 1 to 5 and a downward position as shown in FIG. 6. The upward position may serve for carrying the first tool 10 and the downward position may serve for utilizing the first tool 10, e.g. the loader bucket 11, for carrying out dozer work with the construction machine 1. In other words, in the upward position, the first tool 10 is spaced from the ground, whereas it is in contact with or at least in proximity of the ground in the downward position. The first tool carrier 40 and/or the second tool carrier 50 may be powered by the at least one battery (not shown) and the at least one electric motor (not shown).

The second tool carrier 50 may be arranged at the front end of the upper structure 5, wherein the second tool carrier 50 may be positioned adjacent to the articulated boom 2 and/or in front of the engine-hydraulic unit 15. The articulated boom 2 may be arranged in between the driver cabin 9 and the second tool carrier 50. The second tool carrier 50 may be accommodated in a frame recess 8 of the machine frame 6 and may be pivoted from a stowed position, as shown in FIGS. 1, 3, 5, and 6, to at least one pivot position, as shown in FIGS. 2 and 4. Hereto, the second tool carrier 50 may be pivotably attached to the machine frame 6. A pivoting movement of the second tool carrier 50 may be provided by a positioning cylinder 52, for example a hydraulic positioning cylinder. Two tools 20, 30 may be carried on the second tool carrier 50. The tools 20, 30 may be the excavator bucket 21 and the hammer 31, both mountable to the tool mount 3.

Alternatively, or additionally, with respect to the movable attachment of the second tool carrier 50 to the machine frame 6, the second tool carrier 50 may also be attached to the machine frame 6 with at least two links or articulations (not shown). The links may be arranged on the machine frame 6 and/or on the second tool carrier 50, wherein the links may comprise swivel joints or pivot joints for supporting and pivotably moving the second tool carrier 50 from a stowed position, as for example shown in FIGS. 1, 3, 5, and 6, to at least one pivot position, as for example shown in FIGS. 2 and 4. The links may thus interconnect the second tool carrier 50 and the machine frame 6 in a hinge-like manner. The links may further provide a four-bar linkage or a crank rocker for pivoting the second tool carrier 50. The four-bar linkage may comprise four joints, two of those may be arranged on the machine frame 6. The second tool carrier 50 may be pivotably or rigidly attached to at least one of the two further joints of the four-bar linkage, which are not arranged on the machine frame 6 and which are both pivotably movable with respect to the machine frame 6. According to one of these mechanisms, the second tool carrier 50 may be moved on a segment of a circular arc. Such an attachment design of the second tool carrier 50 to the machine frame 6 may be advantageous, as it may provide more flexibility in positioning the second tool carrier 50 for a tool change.

Further alternatively, or additionally, with respect to the movable attachment of the second tool carrier 50 to the machine frame 6, the second tool carrier 50 may also be attached to the machine frame 6 with at least one not pivotable link (not shown). For example, the second tool carrier 50 may be attached to the machine frame 6 with two not pivotable links. The at least one link may be arranged on the machine frame 6 and/or on the second tool carrier 50, wherein the at least one link may be a slide or runner for carrying and linearly moving the second tool carrier 50 from a stowed position, as for example shown in FIGS. 1, 3, 5 and 6, to at least one moved out position, as for example shown in FIGS. 2 and 4. The at least one link may thus interconnect the second tool carrier 50 and the machine frame 6 in a linearly adjustable manner. Herewith, the second tool carrier 50 may be moved along a linear path of movement. Thus, the at least one link may provide a linear pullout of the second tool carrier 50.

Further alternatively, or additionally, with respect to the movable attachment of the second tool carrier 50 to the machine frame 6, the second tool carrier 50 may also be attached to the machine frame 6 with at least one not pivotable link (not shown). For example, the second tool carrier 50 may be attached to the machine frame 6 with two not pivotable links. The not pivotable one link may be arranged on the machine frame 6 and/or on the second tool carrier 50, wherein the not pivotable one link may be a slide or runner for carrying and linearly moving the second tool carrier 50 from a stowed position, as for example shown in FIGS. 1, 3, 5, and 6, to at least one moved out position, as for example shown in FIGS. 2 and 4. The not pivotable one link may thus interconnect the second tool carrier 50 and the machine frame 6 in a linearly adjustable manner. Herewith, the second tool carrier 50 may be moved along a linear path of movement. Thus, the at least one link may provide a linear pullout of the second tool carrier 50.

Different operational modes of the construction machine 1 are subsequently described with reference to the FIGS. 1 to 6.

Figure 1:
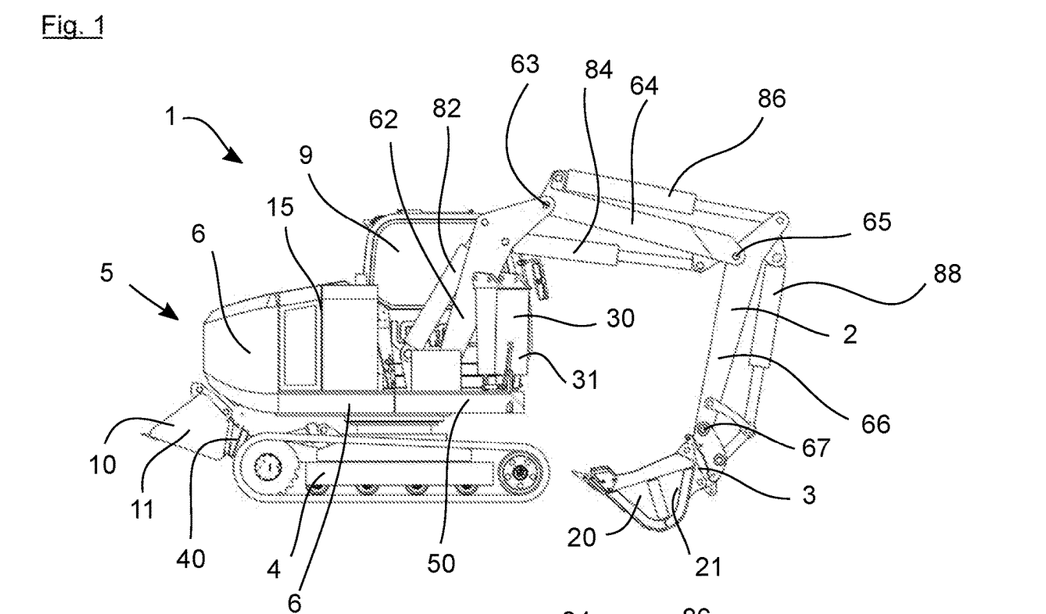
FIG. 1 generally illustrates a side view of a construction machine in an excavator mode according to the principles of the present disclosure.
Figure 2:
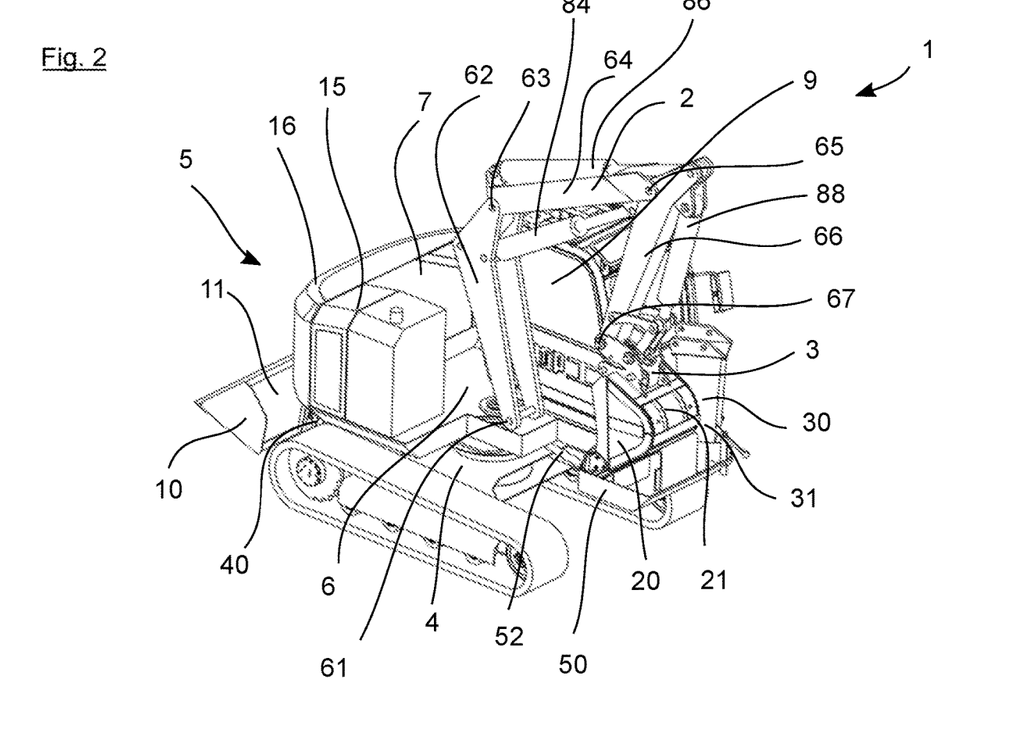
FIG. 2 generally illustrates a perspective view of the construction machine of FIG. 1 during an operational mode change from, or to, the excavator mode.

FIG. 1 shows the construction machine 1 in an excavator mode being an operational mode of the construction machine 1. In this operational mode, the articulated boom 2 may be arranged in an unlocked configuration such that all boom articulations 61, 63, 65, 67 are unlocked and all arms 62, 64, 66 are movable. In this excavator mode, the excavator bucket 21 may be mounted to the tool mount 3. The loader bucket 11 and the hammer 31 may be carried by the construction machine 1 by depositing them in the tool storage, i.e. the first tool 10 or second tool carrier 50.

FIG. 2 shows the construction machine of FIG. 1 during a step of selecting or picking of the excavator bucket 21 by the tool mount 3 attached to the distal arm 66 of the articulated boom 2 for operation of the construction machine 1 in the excavator mode as shown in FIG. 1. Hereto, the excavator bucket 21 may be taken by the tool mount 3 from a first tool retaining portion 152 of the second tool carrier 50. To allow for such a pickup, the second tool carrier 50 may be pivoted from a stowed position as shown in FIG. 1 to a first changing position. In the first changing position of the second tool carrier 50, the excavator bucket 21 may be picked from the tool carrier 50 by the tool mount 3. Thus, the first changing position is situated in a working space of the articulated boom 2, i.e. at a position that is reachable by the tool mount 3 of the articulated boom 2. The tool mount 3 may snap in the excavator bucket 21 automatically. For reaching the first changing position, the second tool carrier 50 may be pivoted from the stowed position by 90°, as derivable from a comparison of FIGS. 1 and 2.

Figure 3:
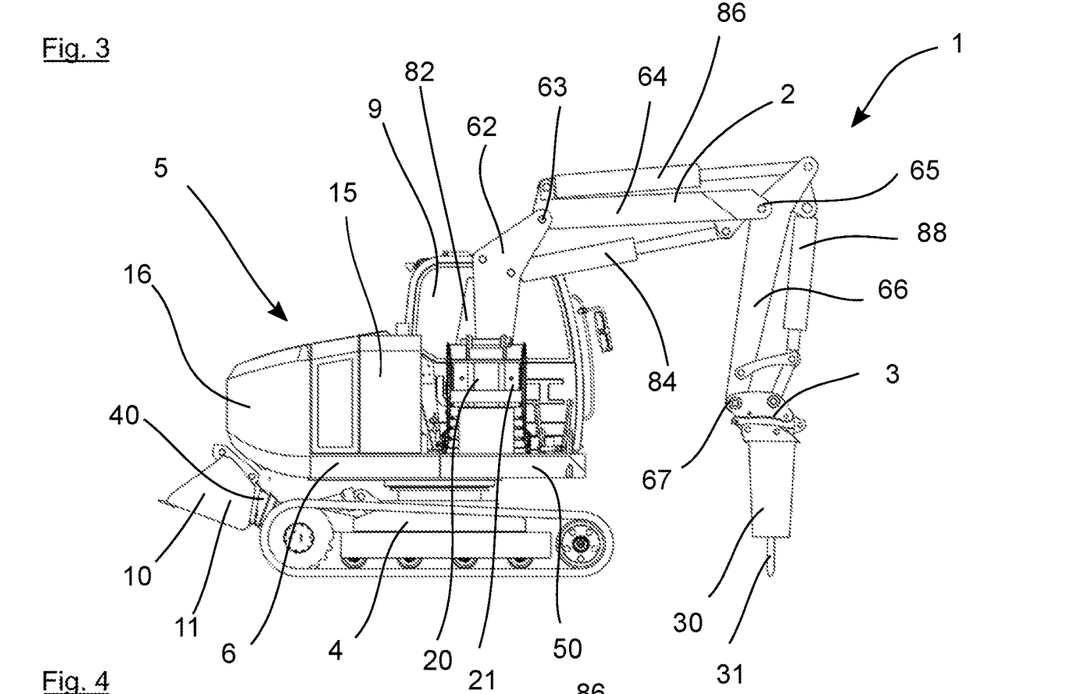
FIG. 3 generally illustrates a side view of the construction machine of FIG. 1 in a hammer mode.
Figure 4:
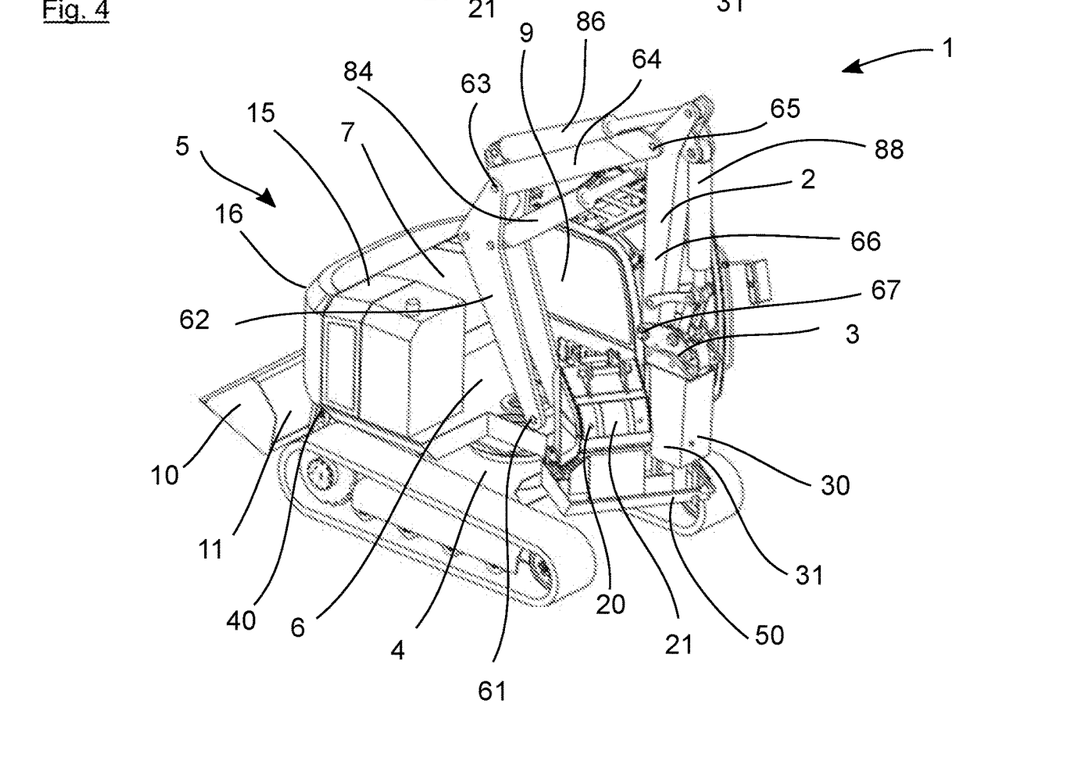
FIG. 4 generally illustrates a perspective view of the construction machine of FIG. 1 during an operational mode change from, or to, the hammer mode.

FIG. 3 shows the construction machine 1 in a hammer mode as a further operational mode of the construction machine 1. In this operational mode, the articulated boom 2 may be arranged in an unlocked configuration, in which all boom articulations 61, 63, 65, 67 are movable. The hammer 31 may be mounted on the tool mount 3, and the loader bucket 11 and the excavator bucket 21 may be carried by the construction machine 1.

FIG. 4 shows the construction machine 1 in a step of selecting or picking of the hammer 31 by the tool mount 3 attached to the distal arm 66 of the articulated boom 2 for operation of the construction machine 1 in the hammer mode as shown in FIG. 3. Hereto, the hammer 31 may be taken from a second tool retaining portion 154 of the second tool carrier 50 by the tool mount 3. To allow for such a pickup, the second tool carrier 50 may be pivoted from a stowed position as shown in FIG. 3 to a second changing position. In the second changing position of the tool carrier 50, the hammer 31 may picked from the tool carrier 50 by the tool mount 3. Thus, the second changing position is situated in a working space of articulated boom 2. The tool mount 3 may snap into the hammer 31 automatically. For reaching the second changing position, the second tool carrier 50 may be pivoted from the stowed position by an angle less than 90°, as derivable from a comparison of FIGS. 3 and 4.

Figure 5:
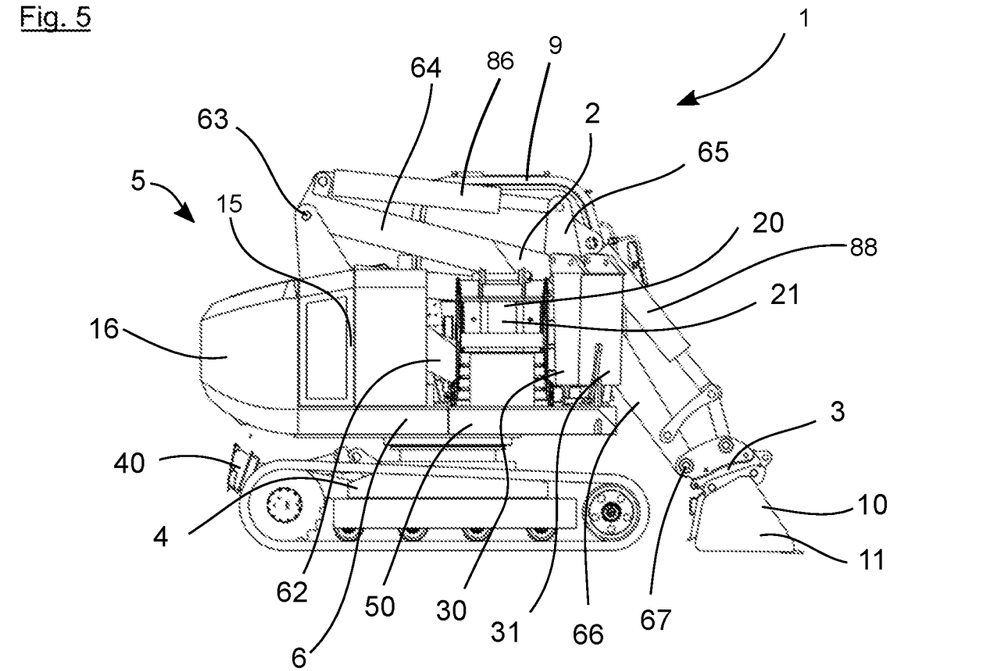
FIG. 5 generally illustrates the construction machine of FIG. 1 in a loader mode.
Figure 6:
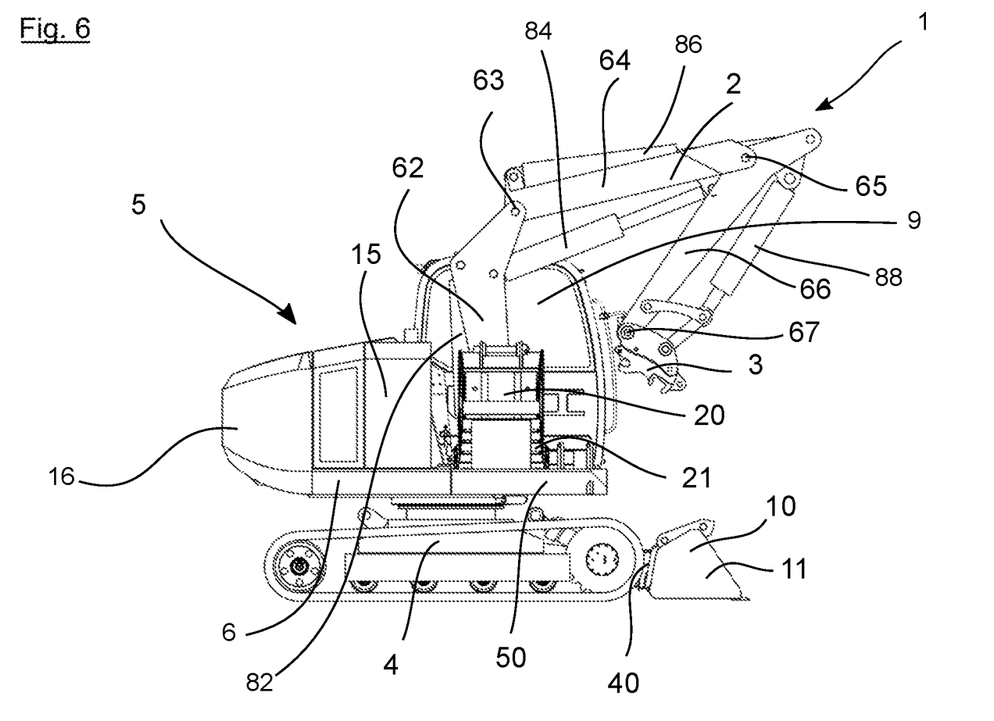
FIG. 6 generally illustrates a side view of the construction machine of FIG. 1 in a dozer mode or during an operational mode change from, or to, the loader mode.

FIG. 5 shows the construction machine 1 in a loader mode as a further operational mode of the construction machine 1. In this operational mode, the articulated boom 2 may be arranged in a partly locked configuration, in which the first articulation 61 may be blocked by interlocking the proximal arm 62 of the articulated boom 2 with the upper structure 5 and/or the machine frame 6 of the construction machine 1. In the loader mode, the articulated boom 2 may be de facto a two-armed boom. The loader bucket 11 may be mounted to the tool mount 3, and the excavator bucket 21 and the hammer 31 may be carried by the construction machine 1.

FIG. 6 shows the construction machine 1 in a dozer mode as a further operational mode of the construction machine 1. In this operational mode, the articulated boom 2 may be not operated. The construction machine 1 exhibits an identical configuration as that shown in FIG. 6 during a change of the operational mode to an excavator mode. For conducting such a change, the loader bucket 11 may be taken by the tool mount 3 from the first tool carrier 40 by pivoting the upper structure 5 around a vertical rotation axis to move the tool mount 3 of the articulated boom above the loader bucket 11 attached to the first tool carrier 40. The upper structure 5 may be pivoted about 180 degrees from the front of the chassis 4 to the rear of the chassis 4 for picking up the loader bucket 11. The tool mount 3 may snap in the loader bucket 11 automatically. After picking of the loader bucket 11 with the tool mount 3, the upper structure may be rotated by 180 degrees with respect to the chassis. Thereafter, the proximal arm 62 may be interlocked with the upper structure 5 and the machine frame 6, respectively, as shown in FIG. 5.

The configuration of the second tool carrier 50, i.e. the tool changer, is subsequently described with reference to FIGS. 7 to 12. In these figures, only the upper structure 5 of the construction machine 1 together with the tool changer 50 is illustrated from above and below. The tool changer 50 comprises the positioning cylinder 52 and a tool carrier articulation 54, for example a pivot joint.

The positioning cylinder 52 may be pivotably attached to the machine frame 6 adjacent to the vertical axis of rotation of the upper structure 5 and further pivotably attached to a base plate 55 of the second tool carrier 50. When extending a piston rod 53 of the positioning cylinder 52, the second tool carrier 50 may be pivoted outwardly to at least one changing position, i.e. to the first and second changing positions, and when retracting the piston rod 53, the second tool carrier 50 may be pivoted back inwardly into its stowed position.

For providing a defined pivoting movement of the second tool carrier 50 by means of the positioning cylinder 52, the tool carrier articulation 54 of the second tool carrier 50 may be arranged on the upper structure 5 and the machine frame 6, respectively. The second tool carrier 50 may be hinged to the tool carrier articulation 54 via a hinging portion 156, which may be attached to the base plate 55 and may be constructed as a pivot arm 157 for providing the pivoting movement. As described above, this may also be realized with a four-bar linkage.

Figure 7:
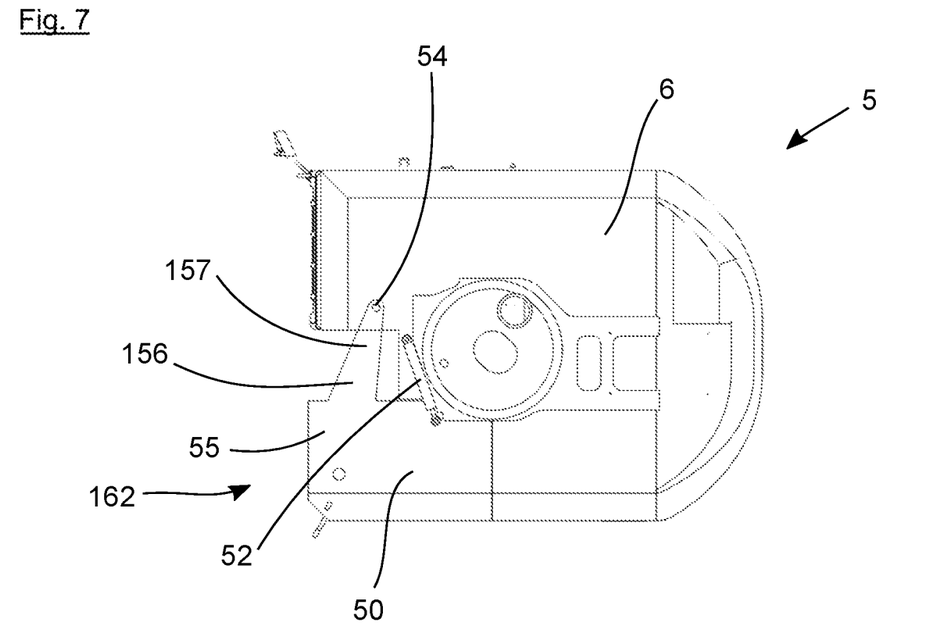
FIG. 7 generally illustrates a plan view of a bottom side of an upper structure of the construction machine of FIG. 1 with a tool changer in a stowed condition.

FIGS. 7 and 8 show the second tool carrier 50 in a stowed position, in which the second tool carrier 50 is accommodated in the upper structure 5 and the machine frame 6, respectively. Specifically, in the stowed position, the second tool carrier 50 is positioned in the frame recess 8 within the upper structure 5 and the machine frame 6, respectively. The frame recess 8 can be seen from above in FIGS. 10 and 12, for example. If the second tool carrier 50 is in the stowed position, the construction machine 1 may be in a loader mode, in which the excavator bucket 21 and the hammer 31 may be carried by the tool carrier 50 as shown in FIG. 8. The stowed position of the tool changer 50 may also be defined as an initial position of a tool exchange process.

Figure 9:
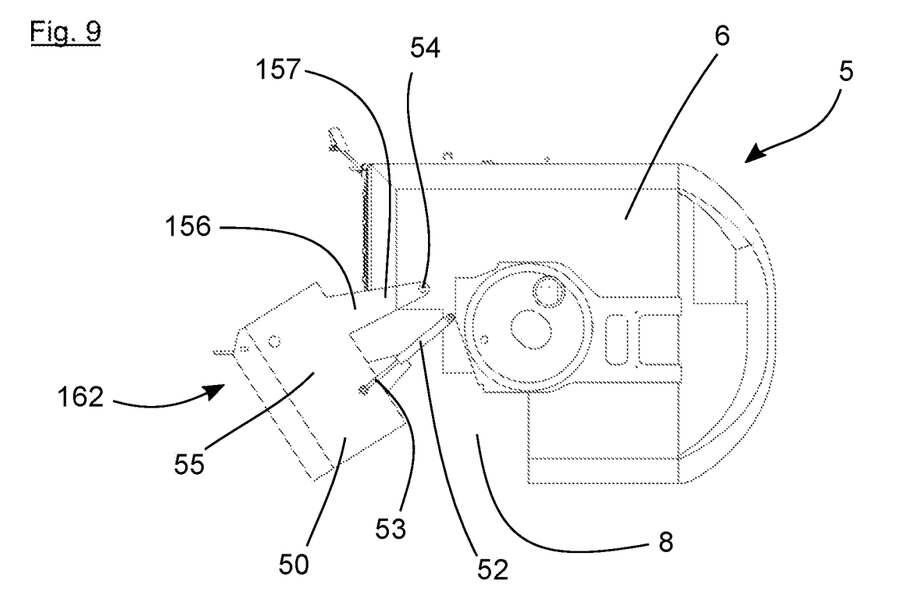
FIG. 9 generally illustrates a plan view of the bottom side of the upper structure of the construction machine of FIG. 1 with the tool changer in an alignment condition.

FIGS. 9 and 10 show the second tool changer 50 in the first changing position, in which the tool changer 50 is pivoted outwardly and away from the machine frame 6. This first changing position may be an alignment condition, in which a hammer 31 that is provided on the second tool carrier 50 may be picked up with the tool mount 3 of the articulated boom 2 (both not shown). By picking the hammer with the articulated boom 2 from the second tool carrier 50, the operational mode of the construction machine 1 may be changed to a hammer mode. In the hammer mode, the excavator bucket 21 may still be carried on the second tool carrier 50.

Figure 11:
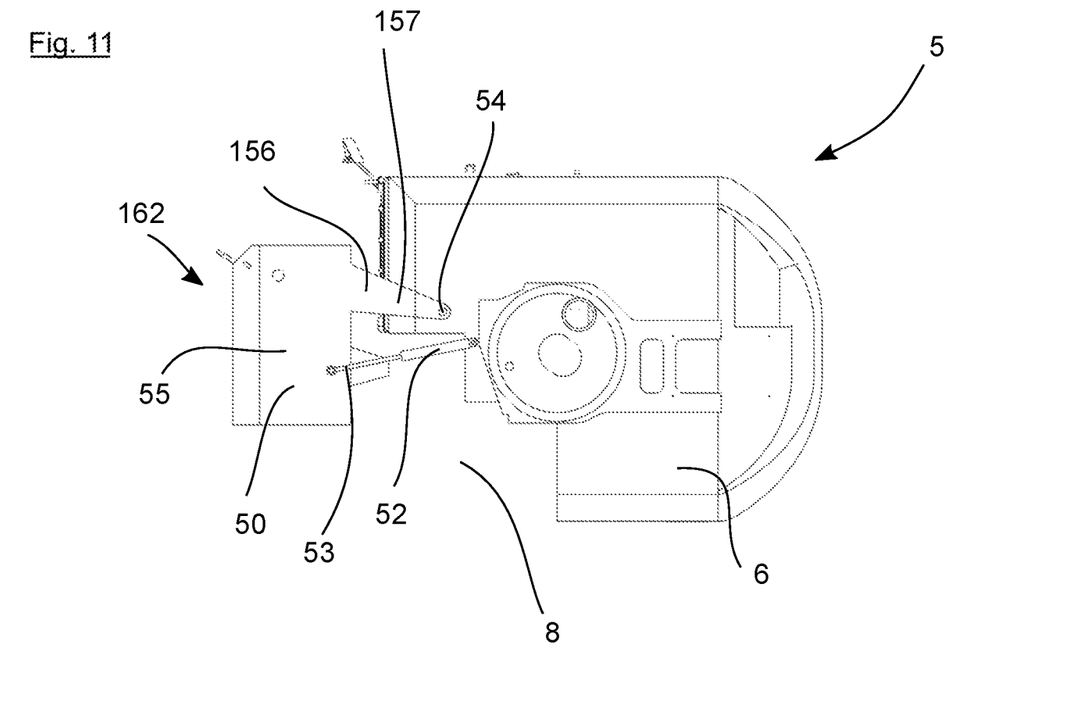
FIG. 11 generally illustrates a plan view of the bottom side of the upper structure of the construction machine of FIG. 1 with the tool changer in a further alignment condition.

FIGS. 11 and 12 show the tool changer 50 in the second changing position pivoted outwardly and away from the machine frame 6. This second changing position may be an alignment condition, in which an excavator bucket 21 that is provided on the second tool carrier 50 may be picked up with the tool mount 3 of the articulated boom 2 (both not shown). By picking the excavator bucket 21 from the second tool carrier 50, the operational mode of the construction machine 1 may be changed to an excavator mode. In the excavator mode, the hammer 31 may still be carried on the second tool carrier 50.

FIGS. 13 to 18 show the tool changer 50 with and without tools 20, 30. The excavator bucket 21 and the hammer 31 may be arranged adjacent to each other on the second tool carrier 50, wherein the excavator bucket 21 may be arranged next to the positioning cylinder 52 and the hammer 31 may be arranged next to the hinging portion 156. The excavator bucket 21 and the hammer 31 may be situated at opposite portions of the tool carrier 50. In the stowed position of the tool changer 50, the excavator bucket 21, i.e. a symmetry plane thereof, may be arranged perpendicular to a working plane of the articulated boom 2, in which the proximal arm 62, the intermediate arm 64 and the distal arm 66 of the articulated boom 2 are moved. The hammer 31 may be arranged obliquely with respect to the excavator bucket 21 in a top view from above. Furthermore, the tools 20, 30 may be arranged on the second tool changer 50 in such a way that they are aligned, i.e. such that a symmetry plane thereof is parallel, with the working plane of the articulated boom 2 in the first (excavator bucket 21) and second changing positions (hammer 31), respectively, as illustrated in FIGS. 2, 4, 10, and 12.

Alternatively, or additionally, with respect to the arrangement of the excavator bucket 21 and the hammer 31 on the second tool carrier 50, the excavator bucket 21 may be arranged next to the hinging portion 156 and the hammer 31 may be arranged next to the positioning cylinder 52 (this arrangement is not shown). In other words, the excavator bucket 21 and the hammer 31 may be arranged in an interchanged manner as shown and described above. Also in this alternative arrangement, in the stowed position of the tool changer 50, the excavator bucket 21, i.e. a symmetry plane thereof, may be arranged perpendicular to the working plane of the articulated boom 2. However, it is also possible that the excavator bucket 21 is arranged obliquely with respect to the working plane of the articulated boom 2 in the stowed position of the tool changer 50. The hammer 31 may be arranged obliquely with respect to the excavator bucket 21 in a top view from above. In an embodiment, a symmetry plane of the hammer 31 is arranged obliquely with respect to a symmetry plane of the excavator bucket 21 in the top view. Furthermore, also in this alternative arrangement, the tools 20, 30 may be arranged on the second tool changer 50 in such a way that they are aligned, i.e. such that a symmetry plane thereof is parallel, with the working plane of the articulated boom 2 in the first (excavator bucket 21) and second changing positions (hammer 31), respectively. In this alternative arrangement, for reaching the first changing position, the second tool carrier 50 may be pivoted from the stowed position by an angle of 90°, as described above. However, for reaching the second changing position in this alternative arrangement, the second tool carrier 50 may be pivoted from the stowed position by an angle larger than 90°. This alternative arrangement may be advantageous, as the construction machine 1 might be operated more often with the excavator bucket 21 than with the hammer 31, the arrangement of the excavator bucket 21 next to the hinging portion 156 allowing for quick installation. This alternative, or additional, arrangement of the tools 20, 30 on the second tool carrier 50 may further improve visibility of a driver sitting in the driver's cabin 9.

The second tool carrier 50 may have two tool retaining portions 152, 154. The excavator bucket 21 may be carried at the first tool retaining portion 152 and the hammer 31 may be carried at the second tool retaining portion 154. The base plate 55 may be divided into the two retaining portions 152, 154. Within the first tool retaining portion 152, a seating 56 may be provided for supporting an excavator bucket 21. The seating 56 may comprise an inclined surface for accommodating the excavator bucket 21.

For securing the tools, the second tool carrier 50 may comprise clamping means 153, 155 for holding the tools. A first clamping means 153 may be provided as a clamp on the first tool retaining portion 152 for holding the excavator bucket 21 and a second clamping means 155 may be provided as a further clamp on the second tool retaining portion 154 for holding the hammer 31. Both clamping means 153, 155 may be actuated by a hydraulic cylinder 151. The first clamping means 153 may be of a pusher-type or pestle-type to exert a pressing force onto the excavator bucket 21 against the seating 56. The second clamping means 155 may be of a pliers-type to exert a holding or pressing force onto the hammer 31 from two opposite sides thereof.

For securing the loader bucket 11 to the first tool carrier 40, an interface might be provided on the machine frame 6, which may comprise at least one element for engaging with the loader bucket 11. For example, pins are driven into a wedge for realizing the engagement.

FIGS. 19 to 22 show an arrangement 100 comprising at least part of the machine frame 6, the articulated boom 2, which is pivotably attached to the machine frame 6, and a locking device 70. The articulation 61 of the proximal arm 62 of the articulated boom 2 may be arranged at the front portion of the machine frame 6 and the locking device 70 may be arranged at the rear portion of the machine frame 6. The distance lying therebetween may substantially correspond to the length of the proximal arm 62.

Furthermore, FIGS. 19 to 22 show a folded-in position of the proximal arm 62 and the intermediate arm 64 of the articulated boom 2, wherein the machine frame 6 and the proximal arm 62, as well as the proximal arm 62 and the intermediate arm 64, each form an acute angle. Folded in, the first positioning cylinder 82, the second positioning cylinder 84 and the third positioning cylinder 86 of the articulated boom 2 are substantially parallel to each other.

The locking device 70 may comprise a double hook 72 or a single hook (not shown) and an arm support 74. The arm support 74 provides a rest surface, against which the proximal arm 62 can be supported. The hook 72 may be actuated by a hydraulic cylinder 73. The hook 72 may be arranged to engageable with a pin 89 that is mounted to the proximal arm 62. Besides, the pin 89 may primarily serve for fixing a piston rod eye 90 of the first positioning cylinder 82 of the proximal arm 62.

Figure 19:
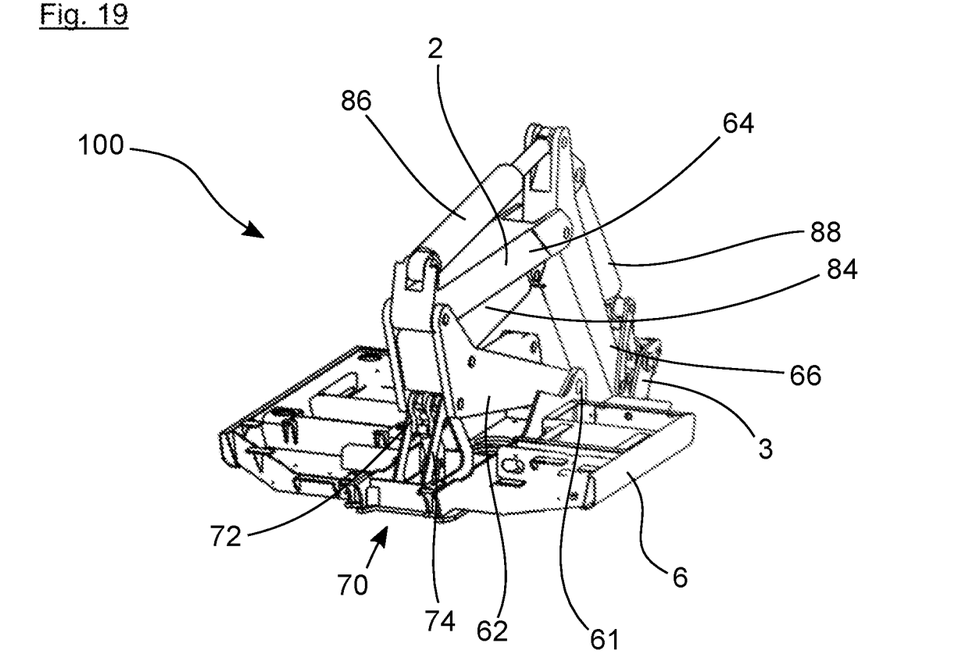
FIG. 19 generally illustrates a perspective view of an arrangement comprising a machine frame and an articulated boom of the construction machine of FIG. 1 in an unlocked configuration.
Figure 20:
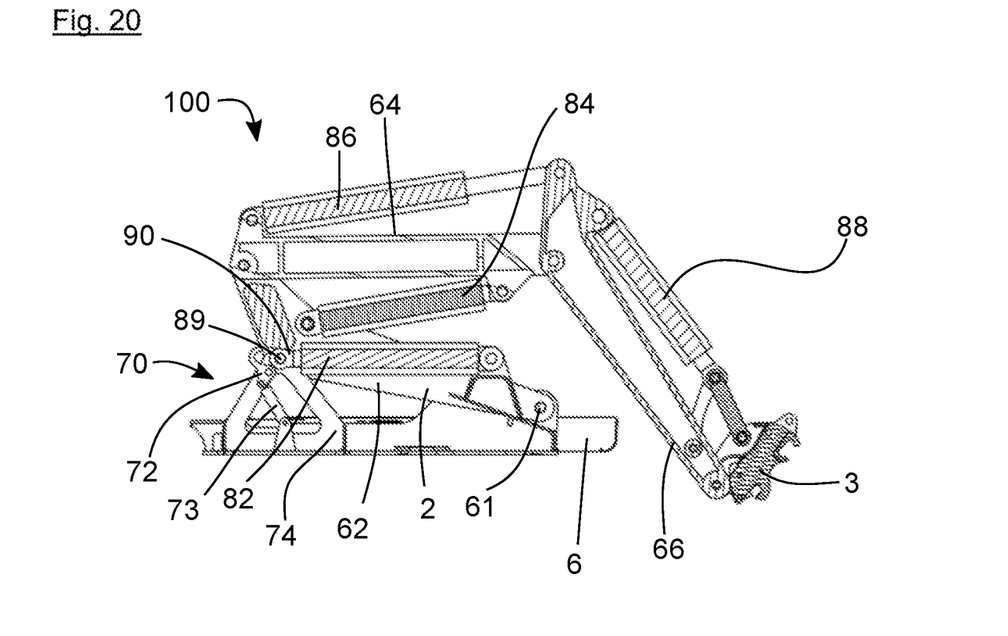
FIG. 20 generally illustrates a sectional side view of the arrangement of FIG. 19.

FIGS. 19 and 20 show an unhooked condition, in which the hook 72 does not engage with the pin 89. However, the proximal arm 62 rests on the arm support 74 allowing for hooking up of the hook 72. In this unhooked condition, the articulated boom 2 may be operated as a three-armed boom, for example in the excavator or hammer mode.

Figure 21:
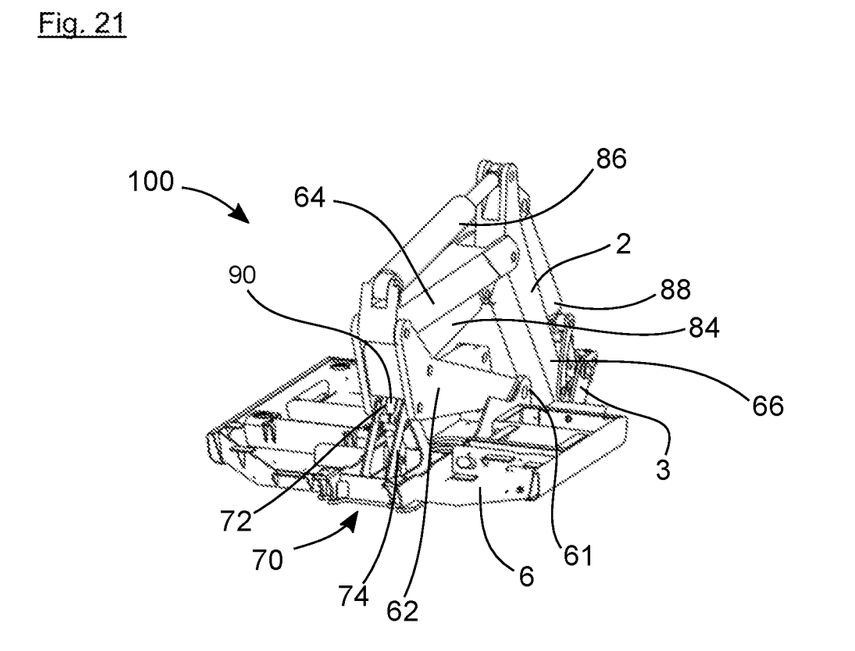
FIG. 21 generally illustrates a perspective view of the arrangement of FIG. 19 in a locked configuration.
Figure 22:
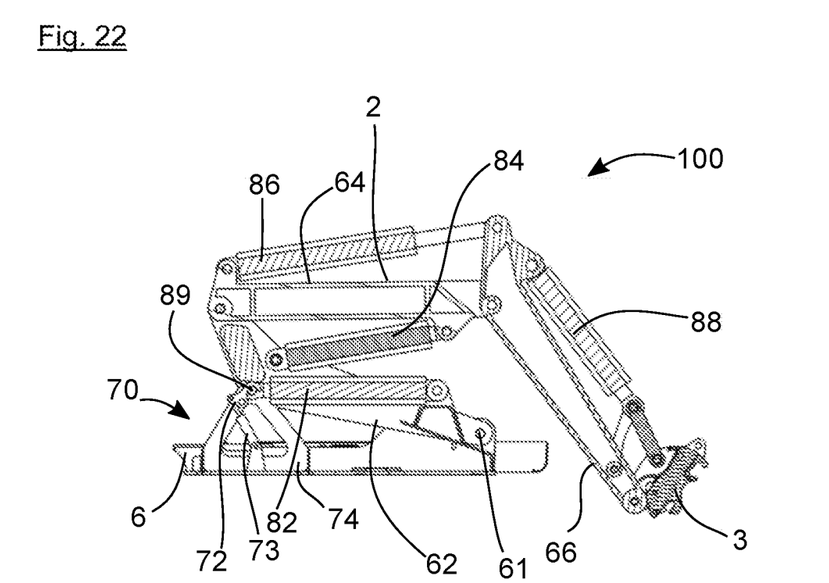
FIG. 22 generally illustrates a sectional side view of the arrangement of FIG. 21.

FIGS. 21 and 22 show a hooked-up condition, in which the hook 72 engages with the pin 89. The proximal arm 62 rests on the arm support 74 for stabilizing the arrangement 100. Based on this hooked-up condition, the articulated boom 2 may be operated as a two-armed boom, for example in the loader or dozer mode. In this hooked-up condition, the proximal arm 62 is interlocked with the machine frame 6.

According to the embodiments of the present disclosure as shown in FIGS. 1 to 22, a single construction machine 1 may be efficiently operated in several different operational modes as a plurality of tools 10, 20, 30 is directly provided on the machine body. These tools may be automatically changed by utilizing the tool changer 50, wherein a multiple-armed boom 2 may be partly blocked to allow for variable boom operations tailored to the different operational modes of the construction machine 1.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A tool changer for a construction machine, the construction machine including a chassis, an upper structure, the upper structure being movably mounted on the chassis, and an articulated boom with a tool mount, the articulated boom being pivotably arranged on the upper structure and the articulated boom comprising a positioning cylinder for pivoting the tool mount the tool changer comprises:
   at least one tool retaining portion for holding a tool being mountable to the tool mount of the articulated boom of the construction machine, the tool changer being configured to be movably attached to the upper structure of the construction machine; and
   a moving mechanism for moving the tool retaining portion in alignment with the articulated boom of the construction machine to allow for picking of the tool by the tool mount, the moving mechanism comprising:
      a pivoting mechanism for pivoting the tool changer in a horizontal plane and for pivoting the at least one tool retaining portion of the tool changer in alignment with the articulated boom; and
      a positioning cylinder for providing a pivoting movement of the tool changer.

2. The tool changer of claim 1, further comprising at least two tool retaining portions, each of them for holding the tool being mountable to the tool mount, wherein the tool changer comprises the moving mechanism for moving each of the tool retaining portions in alignment with the articulated boom of the construction machine.

3. The tool changer of claim 1, further comprising a hinging portion that includes a pivot arm for pivotably attaching the tool changer to the construction machine.

4. The tool changer of claim 1, wherein the moving mechanism comprises an actuator that includes a hydraulic positioning cylinder for providing a movability of the tool changer.

5. The tool changer of claim 1, further comprising at least one clamping means for securing the tool on the tool retaining portion.

6. A method for retrofitting the construction machine with the tool changer according to claim 1, the method comprising:
   mounting the tool changer on the construction machine.

7. A construction machine, comprising:
   an upper structure; and
   the tool changer according to claim 1, the tool changer being movably attached to the upper structure.

8. The construction machine of claim 7, wherein the tool changer is movably attached to the upper structure at a movable attachment, and wherein the movable attachment of the tool changer to the upper structure provides movement of the tool changer between a stowed condition of the tool changer, remote from the tool mount of the articulated boom, to an extended condition of the tool changer in alignment with the tool mount.

9. The construction machine of claim 7, wherein the upper structure comprises a recess for accommodating the tool changer in a stowed condition.

10. The construction machine of claim 7, wherein the tool changer includes two tool retaining portions each of them for holding a respective tool, and wherein the tool changer is movably attached to the upper structure for providing movability of the tool changer from a stowed condition into one of two different alignment conditions with the tool mount of the articulated boom, each of the two different alignment conditions allows for picking up one of the respective tools by the tool mount.

11. The construction machine of claim 7, wherein the upper structure and the tool changer are interconnected by at least one articulation that includes at least one pivot joint, for providing a pivoting movability of the tool changer with respect to the upper structure.

12. The tool changer of claim 1, further comprising:
   at least components of a four-bar linkage for pivotably attaching the tool changer to the construction machine.

13. The tool changer of claim 12, the four-bar linkage comprising two hinging portions that include two pivot arms for pivotably attaching the tool changer to the construction machine.

14. A method for mounting a tool on a construction machine that includes an upper structure and an articulated boom that is arranged to the upper structure, the method comprising:
   pivoting a tool changer being movably attached to the upper structure in alignment with a tool mount of the articulated boom; and
   picking up the tool being provided on the tool changer by the tool mount.

15. The method of claim 14, further comprising depositing the tool being mounted on the tool mount onto the tool changer.

16. A method comprising:
   providing, by a control unit of the construction machine, control instructions for performing the method of claim 14.

* * * * *